(12) United States Patent
Cherukuri et al.

(10) Patent No.: US 8,204,067 B2
(45) Date of Patent: Jun. 19, 2012

(54) TECHNIQUE FOR LANE VIRTUALIZATION

(75) Inventors: Naveen Cherukuri, San Jose, CA (US);
Jeffrey R. Wilcox, Folsom, CA (US);
Sanjay Dabral, Palo Alto, CA (US);
David S. Dunning, Portland, OR (US);
Tim Frodsham, Portland, OR (US);
Theodore Z. Schoenborn, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1507 days.

(21) Appl. No.: 10/891,348

(22) Filed: Jul. 13, 2004

(65) Prior Publication Data

US 2005/0259599 A1 Nov. 24, 2005

Related U.S. Application Data

(63) Continuation-in-part of application No. 10/850,809, filed on May 21, 2004.

(51) Int. Cl.
*H04L 12/56* (2006.01)
(52) U.S. Cl. ......... 370/402; 370/476; 370/535; 710/107
(58) Field of Classification Search .................... 370/257
See application file for complete search history.

(56) References Cited

U.S. PATENT DOCUMENTS

| | | | |
|---|---|---|---|
| 4,825,404 A * | 4/1989 | Theus | 710/104 |
| 5,446,845 A | 8/1995 | Arroyo et al. | |
| 5,475,857 A | 12/1995 | Dally | |
| 6,055,618 A | 4/2000 | Thorson | |
| 6,381,663 B1 * | 4/2002 | Morrison et al. | 710/108 |
| 6,526,469 B1 | 2/2003 | Drehmel et al. | |
| 6,532,515 B1 | 3/2003 | Morein | |
| 6,557,069 B1 | 4/2003 | Drehmel et al. | |
| 6,960,933 B1 | 11/2005 | Cory et al. | |
| 7,373,541 B1 * | 5/2008 | Stenfort et al. | 713/503 |
| 7,957,428 B2 | 6/2011 | Steinman et al. | |
| 2001/0021969 A1 | 9/2001 | Burger et al. | |
| 2001/0046237 A1 | 11/2001 | Chan et al. | |
| 2002/0044560 A1 | 4/2002 | Dally et al. | |
| 2002/0129206 A1 | 9/2002 | Khare et al. | |
| 2003/0065500 A1 | 4/2003 | Holaday et al. | |
| 2003/0128051 A1 | 7/2003 | Cliff et al. | |
| 2003/0195990 A1 * | 10/2003 | Greenblat | 709/251 |
| 2004/0027163 A1 * | 2/2004 | Carpenter et al. | 326/83 |
| 2004/0091027 A1 | 5/2004 | Booth | |
| 2004/0095967 A1 | 5/2004 | Sharma | |
| 2004/0153952 A1 | 8/2004 | Sharma et al. | |

(Continued)

FOREIGN PATENT DOCUMENTS

CN 1700700 A 11/2005

(Continued)

OTHER PUBLICATIONS

InfiniBand Architecture Specification Volum 1, Release 1.0a, Jun. 19, 2001, p. 71, 73, 82, 146-147, 155, 321, 752.*

(Continued)

*Primary Examiner* — Jianye Wu
(74) *Attorney, Agent, or Firm* — Caven & Aghevli LLC

(57) ABSTRACT

A technique to perform virtualization of lanes within a common system interface (CSI) link. More particularly, embodiments described herein relate to virtualizing interconnective paths between two or more electronic devices residing in an electronic network.

37 Claims, 9 Drawing Sheets

U.S. PATENT DOCUMENTS

| | | | |
|---|---|---|---|
| 2004/0160970 | A1 | 8/2004 | Dally et al. |
| 2004/0268060 | A1* | 12/2004 | Mehta ........................ 711/148 |
| 2005/0022065 | A1 | 1/2005 | Dixon et al. |
| 2005/0027880 | A1 | 2/2005 | Emmot |
| 2005/0259696 | A1 | 11/2005 | Steinman et al. |

FOREIGN PATENT DOCUMENTS

| | | |
|---|---|---|
| EP | 0777357 A2 | 6/1997 |
| JP | 03121626 | 5/1991 |
| JP | 09036823 | 2/1997 |
| RU | 2154355 C2 | 8/2000 |
| TW | 0563021 B | 11/2003 |
| TW | 273404 | 2/2007 |
| TW | I311252 | 6/2009 |
| WO | 00/36790 A1 | 6/2000 |

OTHER PUBLICATIONS

Office Action received for Chinese Patent Application No. 2004100965716, mailed on Nov. 28, 2008, 11 pages inclusive of English translation.

Office Action received for Taiwan Patent Application No. 93125376, mailed on Oct. 18, 2007, 11 pages inclusive of English translation.

Office Action received for Taiwan Patent Application No. 93125376, mailed on May 17, 2007, 4 pages inclusive of English Translation.

Office Action received for Taiwan Patent Application No. 93125376, mailed on Jan. 30, 2007, 8 pages inclusive of English translation.

Office Action received for Chinese Patent Application No. 200410096571.6 , mailed on Aug. 14, 2009, 7 pages of English Translation.

Office Action received for Russian Patent Application No. 2004130346, mailed on Oct. 28, 2005, 4 pages inclusive of English translation.

Office Action received for European Patent Application No. 04257160.4, mailed on Aug. 7, 2007, 5 pages.

International Search Report received for European Patent Application No. 04257160.4, mailed on Nov. 2, 2007, 2 pages.

Office Action received for Japanese Patent Application No. 2004-321189, mailed on Jun. 5, 2007, 7 pages inclusive of English translation.

Office Action received for the Japanese Application No. 093125376, mailed on Jan. 30, 2008, 9 pages inclusive of English Translation.

"Initiatives and Technologies: PCI Express Provides Enterprise Reliability, Availability, and Serviceability", PCI Express Technology, Intel Corporation, 2003, pp. 4-7.

Bhatt, Ajay V., "Creating a Third Generation I/O Interconnect", Technology and Research Labs, Intel Corporation, 2002, pp. 1-8.

Office Action received for U.S. Appl. No. 10/850,809 , mailed on Sep. 13, 2007, 11 pages.

Office Action received for U.S. Appl. No. 10/850,809, mailed on Mar. 4, 2008, 14 pages.

Office Action received for U.S. Appl. No. 10/850,809, mailed on Jul. 23, 2008, 14 pages.

Office Action received for U.S. Appl. No. 10/850,809, mailed on Jan. 15, 2009, 16 pages.

Office Action received for U.S. Appl. No. 10/850,809 , mailed on Apr. 14, 2010, 18 pages.

Office Action received for U.S. Appl. No. 10/850,809 , mailed on Jul. 8, 2009, 17 pages.

European Search Report received for European Patent Application No. 04257160.4, mailed on Nov. 7, 2006, 4 Pages.

Office Action received for the Japanese Application No. 2004-321189, mailed on Jan. 30, 2007, 8 pages inclusive of English Translation.

Office Action received for Taiwan Patent Application No. 093125376, mailed Jan. 30, 2008, 9 pages inclusive of English translation.

Office Action received for Chinese Patent Application No. 200410096571.6, mailed on Feb. 12, 2010,17 pages inclusive of English translation.

Bellami, "Digital Telephony", Radio and Communications, 1986, pp. 286-288, 401. (No English Translation Available).

Office Action received for Chinese Patent Application No. 200410096571.6, mailed on Sep. 28, 2011, 20 pages inclusive of English translation.

Notice of Allowance received for U.S. Appl. No. 10/850,809, mailed on Jan. 11, 2011, 8 pages.

* cited by examiner

| COLUMN NUMBER | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| phit 0 | 0:0 | 0:1 | 0:2 | 0:3 | 0:4 | 0:5 | 0:6 | 0:7 | 0:8 | 0:9 | 0:10 | 0:11 | 0:12 | 0:13 | 0:14 | 0:15 | 0:16 | 0:17 | 0:18 | 0:19 |
| phit 1 | 1:0 | 1:1 | 1:2 | 1:3 | 1:4 | 1:5 | 1:6 | 1:7 | 1:8 | 1:9 | 1:10 | 1:11 | 1:12 | 1:13 | 1:14 | 1:15 | 1:16 | 1:17 | 1:18 | 1:19 |
| phit 2 | 2:0 | 2:1 | 2:2 | 2:3 | 2:4 | 2:5 | 2:6 | 2:7 | 2:8 | 2:9 | 2:10 | 2:11 | 2:12 | 2:13 | 2:14 | 2:15 | 2:16 | 2:17 | 2:18 | 2:19 |
| phit 3 | 3:0 | 3:1 | 3:2 | 3:3 | 3:4 | 3:5 | 3:6 | 3:7 | 3:8 | 3:9 | 3:10 | 3:11 | 3:12 | 3:13 | 3:14 | 3:15 | 3:16 | 3:17 | 3:18 | 3:19 |
| quadrant <q> | 0 | 1 | 2 | 3 | 0 | 1 | 2 | 3 | 0 | 1 | 2 | 3 | 0 | 1 | 2 | 3 | 0 | 1 | 2 | 3 |
| offset <o> | 0 | 0 | 0 | 0 | 1 | 1 | 1 | 1 | 2 | 2 | 2 | 2 | 3 | 3 | 3 | 3 | 4 | 4 | 4 | 4 |

FIG. 6

| COLUMN NUMBER | 9 | 8 | 7 | 6 | 5 | 4 | 3 | 2 | 1 | 0 |
|---|---|---|---|---|---|---|---|---|---|---|
| phit 0 | 0:18 | 0:16 | 0:14 | 0:12 | 0:10 | 0:8 | 0:6 | 0:4 | 0:2 | 0:0 |
| phit 1 | 1:18 | 1:16 | 1:14 | 1:12 | 1:10 | 1:8 | 1:6 | 1:4 | 1:2 | 1:0 |
| phit 2 | 0:19 | 0:17 | 0:15 | 0:13 | 0:11 | 0:9 | 0:7 | 0:5 | 0:3 | 0:1 |
| phit 3 | 1:19 | 1:17 | 1:15 | 1:13 | 1:11 | 1:9 | 1:7 | 1:5 | 1:3 | 1:1 |
| phit 4 | 2:18 | 2:16 | 2:14 | 2:12 | 2:10 | 2:8 | 2:6 | 2:4 | 2:2 | 2:0 |
| phit 5 | 3:18 | 3:16 | 3:14 | 3:12 | 3:10 | 3:8 | 3:6 | 3:4 | 3:2 | 3:0 |
| phit 6 | 2:19 | 2:17 | 2:15 | 2:13 | 2:11 | 2:9 | 2:7 | 2:5 | 2:3 | 2:1 |
| phit 7 | 3:19 | 3:17 | 3:15 | 3:13 | 3:11 | 3:9 | 3:7 | 3:5 | 3:3 | 3:1 |
| quadrant <q> | y | x | y | x | y | x | y | x | y | x |
| offset <o> | 4 | 4 | 3 | 3 | 2 | 2 | 1 | 1 | 0 | 0 |

FIG. 7

| COLUMN NUMBER | 4 | 3 | 2 | 1 | 0 |
|---|---|---|---|---|---|
| phit 0 | 0:16 | 0:12 | 0:8 | 0:4 | 0:0 |
| phit 1 | 1:16 | 1:12 | 1:8 | 1:4 | 1:0 |
| phit 2 | 0:18 | 0:14 | 0:10 | 0:6 | 0:2 |
| phit 3 | 1:18 | 1:14 | 1:10 | 1:6 | 1:2 |
| phit 4 | 0:17 | 0:13 | 0:9 | 0:5 | 0:1 |
| phit 5 | 1:17 | 1:13 | 1:9 | 1:5 | 1:1 |
| phit 6 | 0:19 | 0:15 | 0:11 | 0:7 | 0:3 |
| phit 7 | 1:19 | 1:15 | 1:11 | 1:7 | 1:3 |
| phit 8 | 2:16 | 2:12 | 2:8 | 2:4 | 2:0 |
| phit 9 | 3:16 | 3:12 | 3:8 | 3:4 | 3:0 |
| phit 10 | 2:18 | 2:14 | 2:10 | 2:6 | 2:2 |
| phit 11 | 3:18 | 3:14 | 3:10 | 3:6 | 3:2 |
| phit 12 | 2:17 | 2:13 | 2:9 | 2:5 | 2:1 |
| phit 13 | 3:17 | 3:13 | 3:9 | 3:5 | 3:1 |
| phit 14 | 2:19 | 2:15 | 2:11 | 2:7 | 2:3 |
| phit 15 | 3:19 | 3:15 | 3:11 | 3:7 | 3:3 |
| quadrant <q> | x | x | x | x | x |
| offset <o> | 4 | 3 | 2 | 1 | 0 |

FIG. 8

Full Width

| Column Number | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| Phit 0 | 0:0 | 0:1 | 0:2 | 0:3 | 0:4 | 0:5 | 0:6 | 0:7 | 0:8 | 0:9 | 0:10 | 0:11 | 0:12 | 0:13 | 0:14 | 0:15 | 0:16 | 0:17 | 0:18 | 0:19 |
| Phit 1 | 1:0 | 1:1 | 1:2 | 1:3 | 1:4 | 1:5 | 1:6 | 1:7 | 1:8 | 1:9 | 1:10 | 1:11 | 1:12 | 1:13 | 1:14 | 1:15 | 1:16 | 1:17 | 1:18 | 1:19 |
| Phit 2 | 2:0 | 2:1 | 2:2 | 2:3 | 2:4 | 2:5 | 2:6 | 2:7 | 2:8 | 2:9 | 2:10 | 2:11 | 2:12 | 2:13 | 2:14 | 2:15 | 2:16 | 2:17 | 2:18 | 2:19 |
| Phit 3 | 3:0 | 3:1 | 3:2 | 3:3 | 3:4 | 3:5 | 3:6 | 3:7 | 3:8 | 3:9 | 3:10 | 3:11 | 3:12 | 3:13 | 3:14 | 3:15 | 3:16 | 3:17 | 3:18 | 3:19 |
| Quadrant | 0 | 0 | 0 | 0 | 0 | 1 | 1 | 1 | 1 | 1 | 2 | 2 | 2 | 2 | 2 | 3 | 3 | 3 | 3 | 3 |
| Offset | 0 | 1 | 2 | 3 | 4 | 0 | 1 | 2 | 3 | 4 | 0 | 1 | 2 | 3 | 4 | 0 | 1 | 2 | 3 | 4 |

FIG. 9

Half Width

| Column Number | 9 | 8 | 7 | 6 | 5 | 4 | 3 | 2 | 1 | 0 |
|---|---|---|---|---|---|---|---|---|---|---|
| Phit 0 | 0:9 | 0:8 | 0:7 | 0:6 | 0:5 | 0:4 | 0:3 | 0:2 | 0:1 | 0:0 |
| Phit 1 | 0:19 | 0:18 | 0:17 | 0:16 | 0:15 | 0:14 | 0:13 | 0:12 | 0:11 | 0:10 |
| Phit 2 | 1:9 | 1:8 | 1:7 | 1:6 | 1:5 | 1:4 | 1:3 | 1:2 | 1:1 | 1:0 |
| Phit 3 | 1:19 | 1:18 | 1:17 | 1:16 | 1:15 | 1:14 | 1:13 | 1:12 | 1:11 | 1:10 |
| Phit 4 | 2:9 | 2:8 | 2:7 | 2:6 | 2:5 | 2:4 | 2:3 | 2:2 | 2:1 | 2:0 |
| Phit 5 | 2:19 | 2:18 | 2:17 | 2:16 | 2:15 | 2:14 | 2:13 | 2:12 | 2:11 | 2:10 |
| Phit 6 | 3:9 | 3:8 | 3:7 | 3:6 | 3:5 | 3:4 | 3:3 | 3:2 | 3:1 | 3:0 |
| Phit 7 | 3:19 | 3:18 | 3:17 | 3:16 | 3:15 | 3:14 | 3:13 | 3:12 | 3:11 | 3:10 |
| Quadrant | y | y | y | y | y | x | x | x | x | x |
| Offset | 4 | 3 | 2 | 1 | 0 | 4 | 3 | 2 | 1 | 0 |

Quarter Width

| Column Number | 4 | 3 | 2 | 1 | 0 |
|---|---|---|---|---|---|
| Phit 0 | 0:4 | 0:3 | 0:2 | 0:1 | 0:0 |
| Phit 1 | 0:9 | 0:8 | 0:7 | 0:6 | 0:5 |
| Phit 2 | 0:14 | 0:13 | 0:12 | 0:11 | 0:10 |
| Phit 3 | 0:19 | 0:18 | 0:17 | 0:16 | 0:15 |
| Phit 4 | 1:4 | 1:3 | 1:2 | 1:1 | 1:0 |
| Phit 5 | 1:9 | 1:8 | 1:7 | 1:6 | 1:5 |
| Phit 6 | 1:14 | 1:13 | 1:12 | 1:11 | 1:10 |
| Phit 7 | 1:19 | 1:18 | 1:17 | 1:16 | 1:15 |
| Phit 8 | 2:4 | 2:3 | 2:2 | 2:1 | 2:0 |
| Phit 9 | 2:9 | 2:8 | 2:7 | 2:6 | 2:5 |
| Phit 10 | 2:14 | 2:13 | 2:12 | 2:11 | 2:10 |
| Phit 11 | 2:19 | 2:18 | 2:17 | 2:16 | 2:15 |
| Phit 12 | 3:14 | 3:13 | 3:12 | 3:11 | 3:10 |
| Phit 13 | 3:19 | 3:18 | 3:17 | 3:16 | 3:15 |
| Phit 14 | 3:4 | 3:3 | 3:2 | 3:1 | 3:0 |
| Phit 15 | 3:9 | 3:8 | 3:7 | 3:6 | 3:5 |
| Quadrant | x | x | x | x | x |
| Offset | 4 | 3 | 2 | 1 | 0 |

FIG. 9 (CONT.)

TECHNIQUE FOR LANE VIRTUALIZATION

RELATED APPLICATIONS

This Application is a continuation-in-part of U.S. patent application Ser. No. 10/850,809, filed on May 21, 2004.

FIELD

Embodiments of the invention relate to electronic networks. More particularly, embodiments of the invention relate to virtualizing interconnective paths between two or more electronic devices residing in an electronic network.

BACKGROUND

In typical electronic networks, particularly those composed of a number of interconnected bus agents (e.g., semiconductor devices) within a computer system, some of the physical interconnective pathways may be driven to a constant value for the duration or some other period of operation of the network. Within an electronic network, such as a computer system, this means that certain bus traces that connect bus agents within the computer system may be driven to a static value, such as a logical "1", "0", or an indeterminate value, such as "tri-state".

Driving a particular bus trace to a value typically requires the input/output ("I/O") of one of the bus agents connected to the bus trace to force the value onto the bus trace, thereby using power for the duration of the operation of the computer system. Similarly, an I/O of the receiving agent may also consume power while the transmitting agent is driving a constant value. The term "drive" when used in the context of a value placed on a bus, can also refer to the static power drawn when no current is flowing in the bus or corresponding I/O. Alternatively, the bus trace may be connected to a circuit that holds the device at a certain state without requiring a device I/O to drive the bus trace to that value. However, in this configuration the circuit that drives the bus trace to a particular value may consume current and therefore contribute to the power consumption of the computer system.

FIG. 1 is a prior art example of a portion of a computer system in which a bus trace connecting two bus agents drives a constant value onto the bus trace in order to represent a static value. In some prior art applications, the driver may consist of an inverter circuit, for example, that draws power due to leakage currents within the semiconductor devices of which the circuit is composed.

In a typical point-to-point (PtP) computer system in which a common system interface (CSI) bus architecture and protocol is used, each link between the bus agents may contain numerous traces or "lanes" that are used to transmit data from a transmitting agent to a receiving agent. Regardless of whether the lanes are operating in a dynamic, or "switching" mode, or a static mode, in which a constant value is driven onto the lane, power may be drawn by the lane due to, for example, leakage or other sources within the input/output ("I/O") circuits within the receiving and/or transmitting agents.

BRIEF DESCRIPTION OF THE DRAWINGS

Embodiments of the invention are illustrated by way of example and not limitation in the figures of the accompanying drawings, in which like references indicate similar elements and in which:

FIG. 6 illustrates the flit format and phit order for a full-width link, according to one embodiment of the invention, wherein one 80 bit flit is organized in four 20 bit phits.

FIG. 7 illustrates a flit format and phit order for a half-width link, according to one embodiment of the invention, wherein one 80 bit flit is organized in eight 10 bit phits.

FIG. 8 illustrates a flit format and phit order for a quarter-width link, according to one embodiment of the invention, wherein one 80 bit flit is organized in sixteen 5 bit phits.

FIG. 9 illustrates a flit format and phit order for a full, half, and quarter-width link according to an alternative phit grouping in one embodiment of the invention.

DETAILED DESCRIPTION

Embodiments of the invention relate to electronic networks. More particularly, embodiments of the invention relate to the virtualization of interconnective paths between two or more electronic devices residing in an electronic network.

Some embodiments of the invention described herein relate to a bus trace ("lane") virtualization technique for point-to-point (PtP) computer systems implementing a common system interface (CSI) to communicate data between the various agents within a PtP network. However, the principles described herein may readily be applied to other computer systems in which other bus topologies, architectures, and/or protocols are implemented. Advantageously, embodiments of the invention described herein can reduce the power drawn by static lanes within the computer network as well as reduce the number of lanes and/or device pins required to interface various bus agents within the computer system. Furthermore, embodiments of the invention enable buses of different widths to dynamically configure themselves to communicate over a CSI link.

Figure 1:
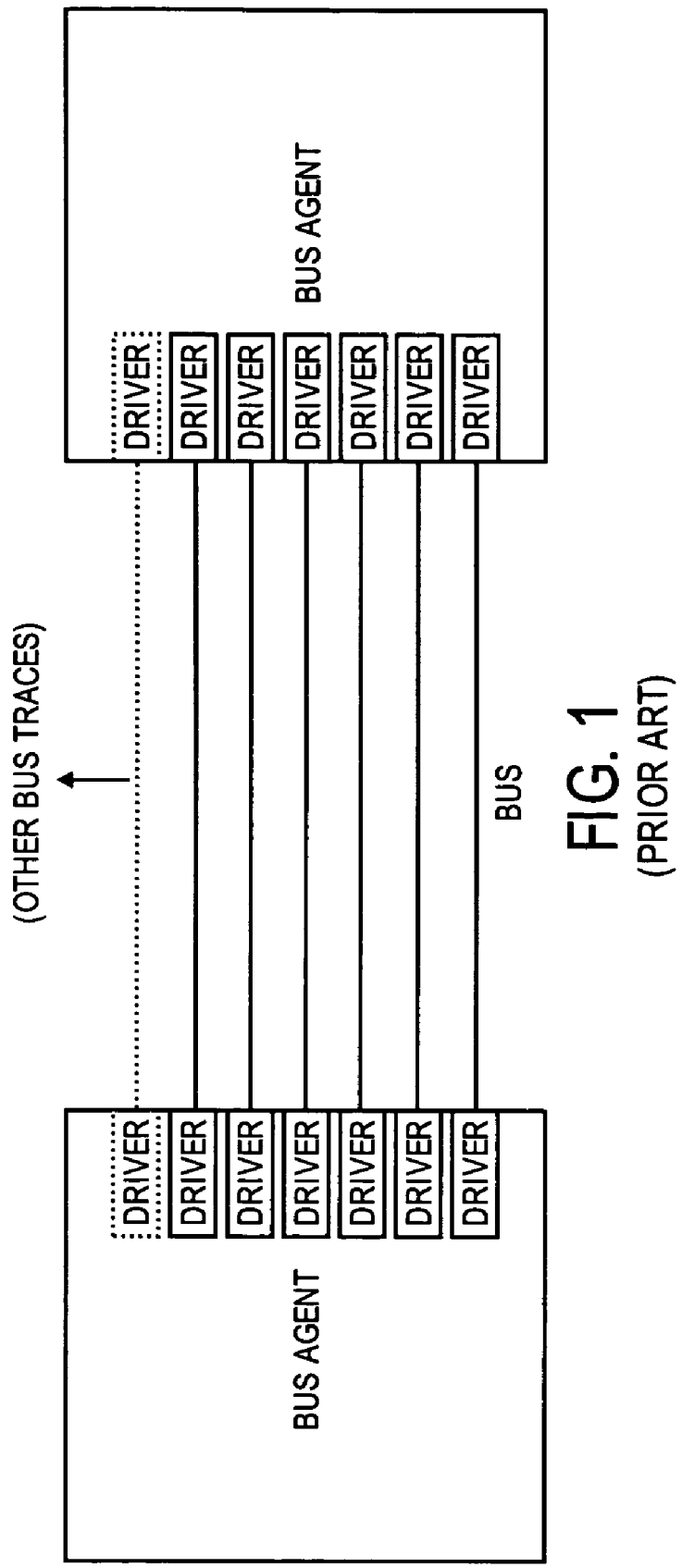
FIG. 1 is a prior art portion of a computer system in which a driver is used to drive a bus trace connecting two bus agents to a particular static value.
Figure 2:
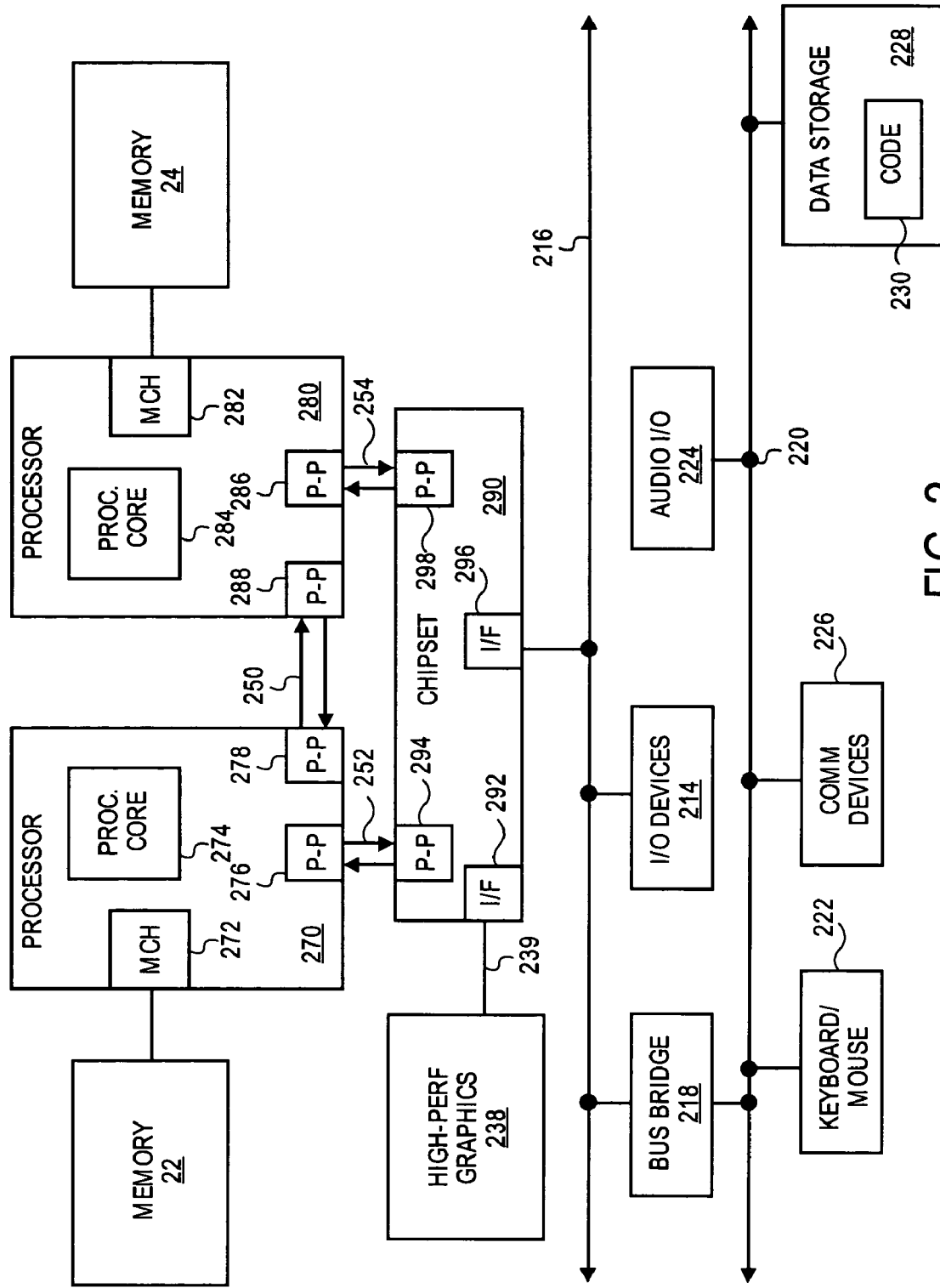
FIG. 2 is a PtP computer system in which at least one embodiment of the invention may be used to virtualize static lanes within a link between two or more bus agents.

FIG. 2 illustrates a computer system that is arranged in a point-to-point (PtP) configuration. In particular, FIG. 2 shows a system where processors, memory, and input/output devices are interconnected by a number of point-to-point interfaces.

The system of FIG. 2 may also include several processors, of which only two, processors 270, 280 are shown for clarity. Processors 270, 280 may each include a local memory controller hub (MCH) 272, 282 to connect with memory 22, 24. Processors 270, 280 may exchange data via a point-to-point (PtP) interface 250 using PtP interface circuits 278, 288. Processors 270, 280 may each exchange data with a chipset 290 via individual PtP interfaces 252, 254 using point to point interface circuits 276, 294, 286, 298. Chipset 290 may also exchange data with a high-performance graphics circuit 238 via a high-performance graphics interface 239.

At least one embodiment of the invention may be located within the PtP interface circuits within each of the PtP bus agents of FIG. 2. Other embodiments of the invention, however, may exist in other circuits, logic units, or devices within the system of FIG. 2. Furthermore, other embodiments of the invention may be distributed throughout several circuits, logic units, or devices illustrated in FIG. 2.

In at least one embodiment of the invention, a link consists of 20 of uni-directional lanes, some of which may be configured to a static value. In other embodiments, however, a link may consist of 20 of bidirectional lanes, some of which may be configured to a static value. Although static lanes may not consume dynamic power from switching between logical values, static lanes may in fact consume power by being driven to a static logical value by bus agent I/O's or by logic circuits within the lanes that hold various lanes to a logical value. Embodiments of the invention may reduce power consumption below that of a system in which a static logical value is driven onto the bus, as embodiments of the invention may allow the I/O's themselves to be disabled and/or the corresponding bus trace (or "lane") to be removed altogether.

In some embodiments, computer systems may have one or more lanes, such as those corresponding to sideband signals, such as plafform-specific configuration signals, or cyclic redundancy check (CRC) error checking signals, within a link to be assigned a static value. Other signals, not just CRC and sideband signals, may be assigned static values. In order for a receiving agent to detect the static value driven by a transmitting agent, embodiments of the invention communicate to a receiving agent that lanes of the CSI link are static without using a physical, power consuming, connection between a transmitting agent and the receiving agent.

In at least one embodiment of the invention, static lane power may be substantially reduced or eliminated altogether while also reducing pin count within a link by enabling the receiving agent to represent static lanes with a constant logical value rather than relying on the transmitting agent to drive the value on a lane or lanes of the link to the receiving agent. In order to help enable a receiving agent to generate static lane values, in one embodiment of the invention, a link initialization process is performed in which a transmitting agent communicates information on physical lanes between the transmitting and receiving agents that indicate to the receiving agent, either explicitly or implicitly, that certain lanes should be assigned a static value.

Once the virtual lane initialization information is transmitted to the receiving agent, the receiving and transmitting agents may disable I/O circuits corresponding to the static lanes, thereby preventing the I/O's from drawing power for the duration of operation of the computer system. After receiving the virtual lane initialization information from the transmitting agent, the receiving agent may store the static logical bits within a circuit corresponding to the static lane(s), such that other CSI layers may interpret those lanes as having the assigned static values when exchanging packets of information with the physical CSI layer.

Figure 3:
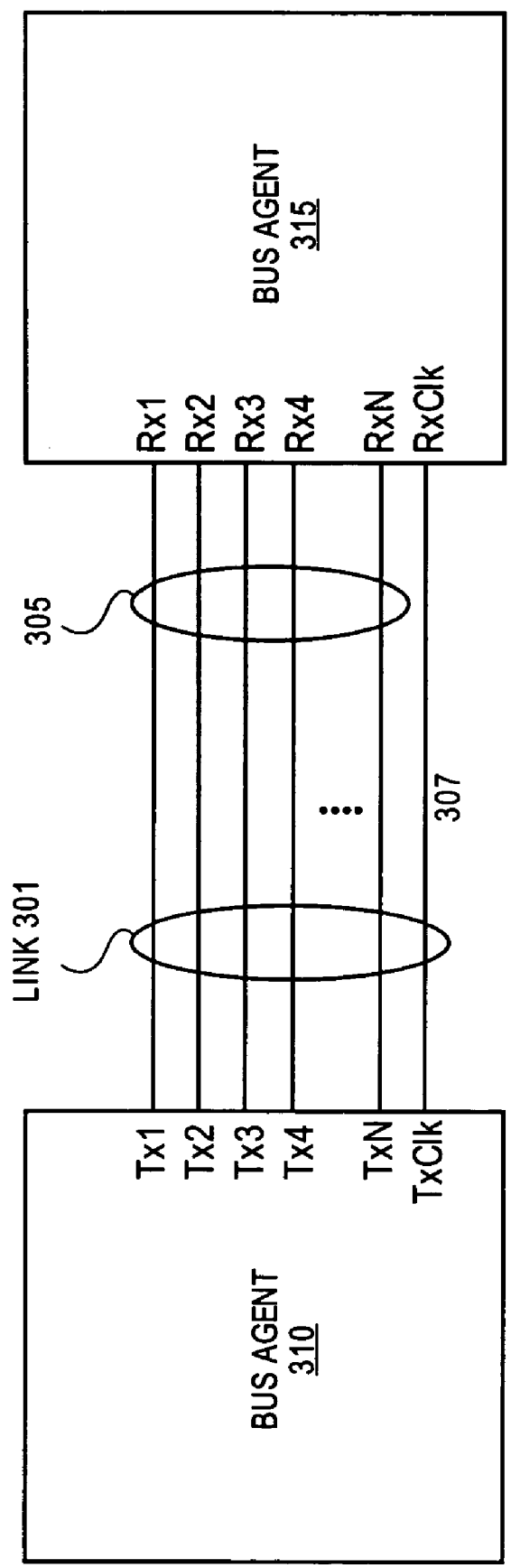
FIG. 3 illustrates two bus agents of a common system interface (CSI) link in which at least one embodiment of the invention may be used.

FIG. 3 illustrates two bus agents, 310 and 315, connected by a PtP link in which embodiments of the invention may be used. In the example illustrated in FIG. 3, the link 301 is composed of "N" number of lanes 305 and a clock signal 307. In at least one embodiment, N is equal to 20, but in other embodiments, N may represent one or more lanes. Furthermore, in some embodiments, the clock signal may not be present. The agents illustrated in FIG. 3 may be processors or other agents, such as an I/O controller hub, or some combination thereof.

The agents of FIG. 3 may be configured to assign static values to one or more of the lanes. Furthermore, in some embodiments, the static values may be assigned to a lane having a physical interconnect or a lane that does not have a physical interconnect. As long as at least one lane is physically interconnecting the agents with, and able to relay, a signal between the agents, embodiments of the invention may use the lane to configure the agents to virtualize any number of lanes in a link.

This may be useful when, for example, one of the agents uses a different number of lanes than the other or when there are fewer number of lanes actually being used than what are physically present in the link. In the event that the agents use a different number of lanes, embodiments of the invention may be used to detect this difference and configure the agents accordingly in order to virtualize unused lanes if necessary. For example, if agent 310 is an 18 pin transmitting agent (Tx) and agent 315 is a 20 pin receiving agent (Rx) (or vice versa) for purposes of a particular transaction or group of transactions, the two unused receiving lanes may, in addition to some of the used lanes, be assigned a static value, thereby creating at least two virtual lanes between the agents. In order to virtualize these two or more lanes, however, information about the lanes must be exchanged between the agents on at least one of the remaining used lanes. In at least one embodiment, the two agents detect and configure each other to virtualize any of the unused lanes, in addition to other lanes, by performing an initialization process.

Figure 4:
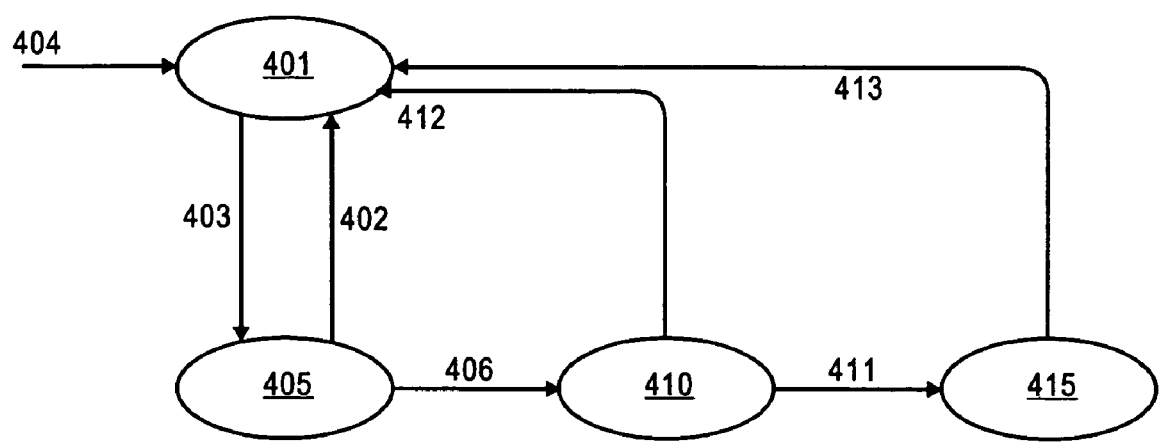
FIG. 4 is a state diagram illustrating various aspects of an initialization process according to one embodiment of the invention to enable the virtualization of at least one lane of a PtP link within a computer system.

FIG. 4 illustrates a state diagram in which a virtual lane initialization technique may be realized according to one embodiment of the invention. In at least one embodiment of the invention, the virtual lane initialization technique illustrated in FIG. 4 is implemented within logic of a state machine of a bus agent within a PtP network of electronic elements. However, in other embodiments the initialization technique of FIG. 4 may be implemented in other ways, including software, processing logic, or some combination thereof.

Referring to FIG. 4, the disable/start state 401, is entered when the link between two electronic elements is powered on or in response to a reset event 404. In at least one embodiment of the invention, various register fields pertaining to the link interface may be reset, I/O ports of the link may be brought to a known impedance state, a link clock may be stabilized, and various calibration operations may be performed. A description of the precise operations performed during the disable/start state of the state diagram of FIG. 4, however, is not necessary to understand embodiments of the invention.

The detect state 405 is entered after the disable/start state has indicated it has finished its operations. In one embodiment of the invention, the disable/start state indicates the completion of operations by asserting a signal 403 to indicate to the detect state that it is acceptable to begin configuring the lanes to be virtualized.

In the detect state, two or more electronic elements of a link may detect each other's presence on the link. In one embodiment of the invention, two electronic devices compose a link and the two electronic devices may perform operations to determine various qualities of the other. For example, in at least one embodiment of the invention, each of the devices may be a transmitting agent and a receiving agent and therefore may drive or receive a signal, such as the clock signal of FIG. 4. Accordingly, the devices may attempt to detect a stable clock between each other. If an error in detection occurs, the detect state may return, indicated by transition 402, to the disable/start state.

After agents detect each other on a link, the state machine may transition 406 to the polling state 410. The polling state may involve several operations, including the removal of skew between the clock and data that is transmitted across the link. In addition, the polling state may include the removal of skew between data lanes themselves. Skew can exist between the clock and data lanes or between data lanes due to the physical characteristics of the link. In at least one embodiment, the removal of skew is performed in the receiving device. However, in other embodiments, skew may be removed in the transmitting device, or in both the transmitting device and the receiving device.

Also in the polling state, the number and identity of lanes to be virtualized can be determined, as the value to be assigned to the virtualized lanes. In one embodiment of the invention a sequence of serial bits, known as a "training sequence" (TS) may be used to encode and convey information pertaining to the virtualized lanes and their respective values. For example, in one embodiment of the invention, the identification of lanes to be assigned a static value, and therefore virtualized, are encoded in a sixth field within the TS, whereas the values of these static lanes are encoded within the seventh field of the TS. In other embodiments, the virtualized lane identification and value indicators may be encoded in other fields of the TS.

Furthermore, the width of the TS fields mentioned above may vary among embodiments of the invention as well as the number of bits that are actually used in the fields. For example, in one embodiment of the invention, only two CRC and two side band lanes may be enabled to be virtualized lanes, in which case the respective TS words would contain at least two bits to identify the virtualized lanes and up to four bits to indicate the value of each virtualized lane. However, in other embodiments, more or fewer bits may be used in the TS to identify the static lanes and their values, depending upon the encoding used and the number of static lanes available. If there is ever a polling error detected, the state machine may return to the disable/start state indicated by transition 412 in order to re-start the initialization process.

In the polling state, lanes, including those not having a corresponding physical interconnect and/or a corresponding physical signal driven from one of the agents, can be virtualized by being assigned a static value. In order to configure a particular lane or lanes to be assigned a static value, for example, without the signal being actually transmitted, received, or even driven on the lane or lanes, the TS is used to configure the agents to assign a value corresponding to the virtualized lane. For example, in one embodiment of the invention, the TS is transmitted from one agent to another across all available and utilized lanes, even though one or more of the lanes may be assigned a static value and virtualized after the initialization process is complete.

Figure 5:
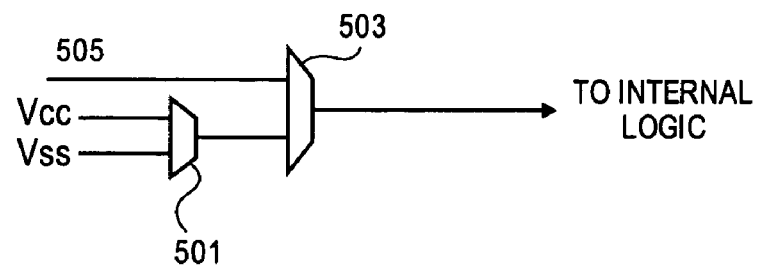
FIG. 5 illustrates a circuit in which a logic value may be represented within a bus agent, according to one embodiment of the invention.

In one embodiment of the invention, the TS enables a circuit, such as the one illustrated in FIG. 5, in a receiving agent to output a static value, such as a logic "1" or "0" from Vcc or Vss, respectively, instead of a signal received from the I/O to which the virtual lane corresponds. Furthermore, in other embodiments, logic "1" or "0" could come from other sources besides Vcc or Vss. Particularly, the TS may contain bits, in some embodiments, to enable MUX 501 to pass either logic "1" or "0" from MUX 503 in the receiving agent instead of the I/O 505 signal.

In other embodiments, the circuit of FIG. 5, or one that performs a substantially similar function, may be configured not by a TS, but by data exchanged on the non-virtualized lanes either during the course of initialization or during normal operation of the link. In such an embodiment, values assigned to the virtual lane(s) may not be considered "static" per se, but may change dynamically by deriving the virtualized lane value(s) from the other non-virtualized I/O's. Furthermore, in some embodiments, the circuit of FIG. 5 may be accompanied or otherwise associated with more extensive logic internal to the receiving agent to decode data transmitted on other I/O's in order to enable virtualized lanes to be dynamically configurable to different values.

For example, in the case previously discussed of the Tx agent having 18 pins and the Rx agent having 20 pins, both of the lanes to which the extra 2 pins of the Rx agent correspond can be configured to a static value using bits within the TS. Alternatively, both of the extra two lanes to which the extra 2 pins of the Rx agent correspond can be configured to values that change or remain constant based on the value of one or some combination of the other signals transmitted over the other 18 lanes.

Although potential virtualized lanes may initially be marked as "bad" in the polling stage, they may ultimately be assigned a static value (via the TS data) or other static or non-static values from data exchanged between the agents on the other "good" lanes. If at least one good data lane is detected between the agents, the state machine enters 411 the configuration state 415.

The configuration state enables the link to be dynamically configured into varying widths, including quarter-width, half-width, and full width links. In order to support varying link widths, the physical layer of the link is organized as 20 lanes per link, in one embodiment of the invention, which can be configured into 10 lanes (half-width) or 5 lanes (quarter width). In full width (20 lanes), 80 link layer ("flit") bits are organized as four groups of 20 bits ("phit"), which are transmitted across the 20 lane physical link sequentially. In half-width, a flit is transmitted across the physical link as 8 phits sequentially. Similarly, quarter width, a flit is transmitted across the physical link as 16 phits sequentially. If an error occurs in the configure state, the state machine may return to the disable/start state, indicated by transition 413, and the initialization process will restart.

Embodiments of the invention that implement the state machine illustrated in FIG. 4, allow devices having varying bus widths to detect each other's respective widths, negotiate a common width, and configure themselves to communicate accordingly over a CSI link. Although full, half, and quarter width bus configurations are explicitly described herein, other widths in other embodiments of the invention may be used, depending on the needs of the system or application. Furthermore, the widths may not be multiples of five, but may be other multiples of integer number of lanes or even one lane.

FIG. 6 illustrates the flit format and phit order for a full-width link, according to one embodiment of the invention, wherein one 80 bit flit is organized in four 20 bit phits. Each bit can be referenced by a quadrant number 601 and an offset number 603, in one embodiment of the invention. The quadrant number represents a quarter section of a link, whereas the offset number represents the bit position within the quadrant.

In one embodiment, the phits are transmitted across the link according to the quadrant offset map 605 in FIG. 6. For example, for each phit transmitted across the 20 lane physical link, bits 0 through 3 of a phit are assigned to bit position 0 of quadrants 0 through 3, respectively. Similarly, bits 4-7 of each phit is mapped to bit 1 of quadrants 0 through 3, and so forth.

FIG. 7 illustrates the flit format and phit order for a half-width link, according to one embodiment of the invention, wherein one 80 bit flit is organized in eight 10 bit phits. Each bit is assigned a quadrant number 701 and an offset number 703, in one embodiment of the invention. The quadrant number represents a quarter section of a link, whereas the offset number represents the bit position within the quadrant.

In one embodiment, the phits are transmitted across the link according to the quadrant/offset map 705 in FIG. 7. However, unlike the full-width link, the half-width link has 10 lanes. Therefore, only two quadrants (x and y) are used to transmit each phit. For example, for each phit transmitted across the 10 lane physical link, bits 0-1 of a phit are assigned to bit position 0 of quadrants x and y, respectively, where x and y represent any two of the available quadrants. Similarly, bits 2-3 of each phit are mapped to bit 1 of quadrants x and y, and so forth.

FIG. 8 illustrates the flit format and phit order for a quarter-width link, according to one embodiment of the invention, wherein one 80 bit flit is organized in sixteen 5 bit phits. Each bit is assigned a quadrant number 801 and an offset number 803, in one embodiment of the invention. The quadrant number represents a quarter section of a link, whereas the offset number represents the bit position within the quardrant.

In one embodiment, the phits are transmitted across the link according to the quadrant/offset map 805 in FIG. 8. However, unlike the full-width or half-width link, the quarter-width link has a physical width of 5 lanes. Therefore, only one quadrant (x) is used to transmit each phit, where x represents any of the available quadrants. For example, for each phit transmitted across the 5 lane physical link, bit 0 of a phit is assigned to bit position 0 of quadrant x. Similarly, bit 1 of each phit is mapped to bit 1 of quadrant x, and so forth.

If certain lanes are designated as static lanes with certain static values, not all bits of each phit are transmitted across the physical link. In one embodiment of the invention, up to four lanes of 20 lanes (in the case of a 20 lane link) are designated to be static, or "virtualized". Furthermore, in at least one embodiment of the invention, only the lanes used to transmit CRC and sideband information across the physical link are virtualized. However, in other embodiments of the invention, the number of lanes in a physical link may be more or less than 20, the number of virtualized lanes may be more or less than 4, and the lanes that may be virtualized may include more, less, or different lanes than those used to transmit CRC and sideband information.

Designation of the width of the physical link between two devices or electronic elements during the configuration state of FIG. 4, also effects the designation of the virtualized lanes. For example, in FIG. 6, the columns 607 indicate that bits 0, 1, 18, and 19 of phits 0-3 are designated as being eligible for virtualization, in one embodiment of the invention in which the physical link is configured as a full-width link. Fewer than the four lanes may actually be virtualized in a given application, however.

Similarly, in FIG. 7, columns 707 indicate that bits 0 and 9 of phits 0-7 are designated as being eligible for virtualization, in one embodiment of the invention in which the physical link is configured as a half-width link. Although for 20 lanes (organized as two 10-bit phits) there are still four lanes that may be virtualized, fewer than four lanes may actually be virtualized in a given application.

Somewhat dissimilarly, in FIG. 8, regions 807 indicate that bit 0 of phits 0, 1, 4, 5, 8, 9, 12, and 13 and bit 4 of the remaining phits are designated as being eligible for virtualization, in one embodiment of the invention in which the physical link is configured as a quarter-width link. Because the virtualized lanes are dependent upon the phit being transmitted across the quarter-width physical link, the respective I/O's of the virtualized lanes may not be able to be powered off and the pins corresponding to the virtualized pins may not be unpopulated throughout the operation of the link. However, at least some power savings may be realized by not transmitting dynamically changing data across the virtualized lanes on each phit transmission cycle. Furthermore, although for 20 lanes (organized as four 5-bit phits) there are still four lanes that may be virtualized in the organization illustrated in FIG. 8, fewer than four lanes may actually be virtualized in a given application. Further power may be saved in some embodiments wherein the columns to be virtualized are done so in a way that ensures column 1 is always virtual, for example.

In each of the link width configurations illustrated in FIGS. 6-8, a number of quadrants are designated for the transmission of dynamically changing data across the physical link in order to transmit a 20 bit groups ("chunks") of data. In other embodiments, the chunk size may be smaller or larger than 20 bits, depending upon the link width and the number of lanes designated as being eligible to transmit data.

FIG. 9 illustrates a flit format and phit ordering for a full, half, and quarter-width link system, according to one embodiment, having different bit groupings than those of FIGS. 6-8. Referring to the flit format/phit ordering map for a full-width (20 lanes) link system, for each phit transmitted across the 20 lane physical link, bits 0 through 4 of a phit are assigned to bit position 0 of quadrants 0 through 4, respectively. Similarly, bits 5-9 of each phit is mapped to bit 1 of quadrants 0 through 4, and so forth. In FIG. 9, bits of each quadrant are grouped and transmitted sequentially rather than being interleaved with each other, regardless of the width of link used.

Referring to the flit format/phit-ordering for the half-width link system of FIG. 9, each of the two quadrants are mapped side-by-side rather than being interleaved, as in FIG. 7. Not also that the phit-ordering is different than that of FIG. 7. Particularly, bits 0-19 of phit 0 are organized sequentially in the first two phits (from right to left) rather than commingling the phit bit positions, as in FIG. 7. Accordingly, the bit grouping illustrated in FIG. 9 enables the phits to be transmitted as two side-by-side quadrants of 5 bits each.

Referring to the flit format/phit-ordering map for a quarter-width link system in FIG. 9, the bits of each phit are organized sequentially within the same quadrant, similar to the half-width link system. Accordingly, the bit grouping FIG. 9 enables the phit bits to be transmitted across a quarter-width link as one quadrant of five bits in width as in FIG. 8.

Other bit groupings may be used in other embodiments of the invention. Accordingly, the particular grouping of bits to be transmitted across a link is not necessary for one of ordinary skill in the art to practice embodiments of the invention.

Embodiments of the invention described herein may be implemented with circuits using complementary metal-oxide-semiconductor devices, or "hardware", or using a set of instructions stored in a medium that when executed by a machine, such as a processor, perform operations associated with embodiments of the invention, or "software". Alternatively, embodiments of the invention may be implemented using a combination of hardware and software.

While the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. An electronics system comprising:
   a first bus agent comprising a first circuit to receive and/or transmit information from/to a second bus agent, the first bus agent to disable the first circuit from transmitting data over an interconnect in response to detecting a sideband signal indicating that the first circuit is to maintain a select state throughout a period of operation of the first bus agent, wherein a link between the first bus agent and the second bus agent is to be started or disabled in response to detection of an instable clock between the first and second bus agents and wherein the link between the first bus agent and the second bus agent is to be started or disabled in response to one of: a power on, detection of a polling error, and detection of error in a configure state.

2. The electronics system of claim 1 wherein the detecting comprises receiving a bit sequence comprising bits to indicate a lane of an interface, to which the first circuit corresponds, that is to represent a constant value to or from the first or second bus agents.

3. The electronics system of claim 2 wherein detecting further comprises receiving a bit sequence comprising at least one bit to indicate the constant value.

4. The electronics system of claim 1 wherein the identity of the first circuit depends, at least in part, on whether the first and second bus agents are to communicate in one of a plurality of possible bus width modes.

5. The electronics system of claim 4 wherein the one of the plurality of possible bus width modes is chosen from a group consisting of: quarter-width, half-width, and full-width.

6. The electronics system of claim 1 wherein the first bus agent comprises a storage circuit to store the constant value after the constant value has been determined, the storage circuit being able to draw as much or less power than the first circuit during the period of operation of the first bus agent.

7. The electronics system of claim 1 wherein the first and second bus agents are semiconductor devices within a point-to-point network of semiconductor devices of a computer system.

8. The electronics system of claim 2 wherein detecting further comprises detecting a logic state within the first bus agent indicate the constant value.

9. The system of claim 1, wherein the select state is chosen from a group consisting of: a logical 1 value, a logical 0 value, and a tri-state value.

10. The system of claim 1, wherein the link between the first bus agent and the second bus agent is to be started or disabled in response to a reset event.

11. The system of claim 1, wherein the link between the first bus agent and the second bus agent is to be started or disabled only in response to one of: a power on, detection of a polling error, and detection of error in a configure state.

12. A computer system comprising:
a memory unit to store at least one instruction, which if executed by a processor, would cause a data word of a first word size to be detected by a receiving agent;
an interconnect, through which only a portion of the data word is to be transmitted to the receiving agent, the portion being less than the entire data word, wherein a transmitting agent coupled to the receiving agent via the interconnect is to disable transmission of data over the interconnect in response to a detection of a sideband signal that the transmitting agent is to maintain a select state throughout a period of operation of the transmitting agent,
wherein a link between the receiving and transmitting agents is to be started or disabled in response to detection of an instable clock between the receiving and transmitting agents.

13. The computer system of claim 12 wherein the portion has a data width smaller than the first word size.

14. The computer system of claim 13 wherein the portion is a whole-width portion.

15. The computer system of claim 13 wherein the portion is a half-width portion.

16. The computer system of claim 13 wherein the portion is a quarter-width portion.

17. The computer system of claim 13 wherein the interconnect is coupled to sixteen input/output pins of the receiving agent.

18. The computer system of claim 13 wherein the interconnect is coupled to eight input/output pins of the receiving agent.

19. The computer system of claim 13 wherein the interconnect is coupled to five input/output pins of the receiving agent.

20. A system comprising:
a first bus agent to communicate a first data word having a first data width;
a second bus agent to detect the first data word;
a bus to transmit only a subset of the first data word from the first bus agent to the second bus agent, the subset being less than the entire data word and having a second data width that is smaller than the first data width, wherein the first bus agent is to disable transmission of data over the bus in response to a detection of a sideband signal that the first bus agent is to maintain a select state throughout a period of operation of the first bus agent,
wherein a link between the first bus agent and the second bus agent is to be started or disabled in response to detection of an instable clock between the first and second bus agents and wherein the link between the first bus agent and the second bus agent is to be started or disabled in response to one of: a power on, detection of a polling error, and detection of error in a configure state.

21. The system of claim 20 wherein the subset includes only variable bit values of the first data word and the remainder of the first data word not included in the subset includes only constant bit values.

22. The system of claim 21 wherein the bus comprises a plurality of lanes, only a number of which, equal to the second data width, are coupled to the first and second bus agent.

23. The system of claim 20 wherein the second data width is less than a quarter of the first data width.

24. The system of claim 20 wherein the second data width is less than half and greater than a quarter of the first data width.

25. The system of claim 20 wherein the second data width is greater than half of the first data width.

26. The system of claim 21 wherein the first and second bus agents comprise at least as many input/output (I/O) circuits as the first data width.

27. The system of claim 26 wherein a number of I/O circuits greater than or equal to the first data width minus the second data width are to be disabled during a period of operation of the first and second bus agents.

28. The system of claim 27 wherein the first and second bus agents and the bus are part of a point-to-point network of electronic devices.

29. A method to operate in an electronic system, the method comprising:
enabling two electronic elements in response to a reset event;
detecting the presence of the two electronic elements on a common bus;
removing skew between a clock reference signal and a plurality of input/output (I/O) signals between the two electronic elements;

removing skew between the plurality of I/O's of the two electronic elements;

determining a number and value of static lanes on the bus;

powering down I/O's corresponding to the static lanes, wherein a first one of the electronic elements is to disable transmission of data over the common bus in response to a detection of a sideband signal indicating that the first electronic element is to maintain a select state throughout a period of operation of the first electronic element, wherein a link between the two electronic elements is to be started or disabled response to detection of an instable clock between the two electronic elements and wherein the link between the two electronic elements is to be started or disabled in response to one of: a power on, detection of a polling error, and detection of error in a configure state.

30. The method of claim 29 wherein the number and value of the static lanes are determined by either or both of the two electronic elements transmitting a sequence of bits to the other, the sequence of bits comprising bits to identify the static lanes and their respective values.

31. The method of claim 30 wherein the static lanes are indicated in a sixth field of the sequence and the value of the static lanes are indicated in the seventh field of the sequence.

32. The method of claim 29 further comprising establighing a clock reference signal between the two electronic elements.

33. The method of claim 29 wherein the number and value of the static lanes are determined by either or both of the electronics elements transmitting a bit or plurality of bits in parrallel to the other electronic element, the bit or plurality of bits to identify the static lanes and their respective values.

34. An apparatus comprising:

a first plurality of input/output (I/O) circuits to transmit and/or detect a plurality of variable signals from a first plurality of point-to-point (PtP) link lanes;

at least one second I/O circuit to be disabled in response to at least one static signal being detected a sideband signal that corresponds to at least one PtP link lane, wherein a link between a first bus agent and a second bus agent, coupled to the first plurality of I/O circuits, is to be started or disabled in response to detection of an instable clock between the first and second bus agents.

35. The apparatus of claim 34 wherein the at least one second I/O corresponds to either a sideband or CRC signal.

36. An apparatus comprising:

a first bus agent to detect a number of lanes coupling the first bus agent to a second bus agent, the first agent to transmit or receive data in a plurality of data widths depending upon the number of lanes, wherein the plurality of data widths are chosen from a group consisting of: a full width, a half width, and a quarter width; and wherein the first bus agent is to disable all input/output (I/O) circuits for which no lane exists to transmit data to the second bus agent, wherein the first bus agent is to disable transmission of data over the I/O circuits in response to a detection a sideband signal indicating that the first bus agent is to maintain a select state throughout a period of operation of the first bus agent, wherein a link between the first bus agent and the second bus agent is to be started or disabled in response to detection of an instable clock between the first and second bus agents and wherein the link between the first bus agent and the second bus agent is to be started or disabled in response to one of: a power on, detection of a polling error, and detection of error in a configure state.

37. The apparatus of claim 36, wherein the select state is chosen from a group consisting of: a logical 1 value, a logical 0 value, and a tri-state value.

* * * * *

UNITED STATES PATENT AND TRADEMARK OFFICE
CERTIFICATE OF CORRECTION

| | | |
|---|---|---|
| PATENT NO. | : 8,204,067 B2 | Page 1 of 1 |
| APPLICATION NO. | : 10/891348 | |
| DATED | : June 19, 2012 | |
| INVENTOR(S) | : Naveen Cherukuri et al. | |

It is certified that error appears in the above-identified patent and that said Letters Patent is hereby corrected as shown below:

On the Title Page, Item (56), under "Other Publications" line 1,
delete "Volum" and insert -- Volume --, therefor.

In column 9, line 38, in claim 8, after "agent" insert -- to --.

In column 11, line 11, in claim 29, after "disabled" insert -- in --.

In column 11, line 25-26, in claim 32, delete "establighing" and insert -- establishing --, therefor.

In column 11, line 31, in claim 33, delete "parrallel" and insert -- parallel --, therefor.

In column 12, line 21, in claim 36, after "detection" insert -- of --.

Signed and Sealed this
Twenty-fifth Day of September, 2012

David J. Kappos
*Director of the United States Patent and Trademark Office*